March 4, 1958     J. LINDENAUER ET AL     2,825,224
SWIMMING STROKE DEVELOPMENT INDICATOR
Filed June 29, 1956
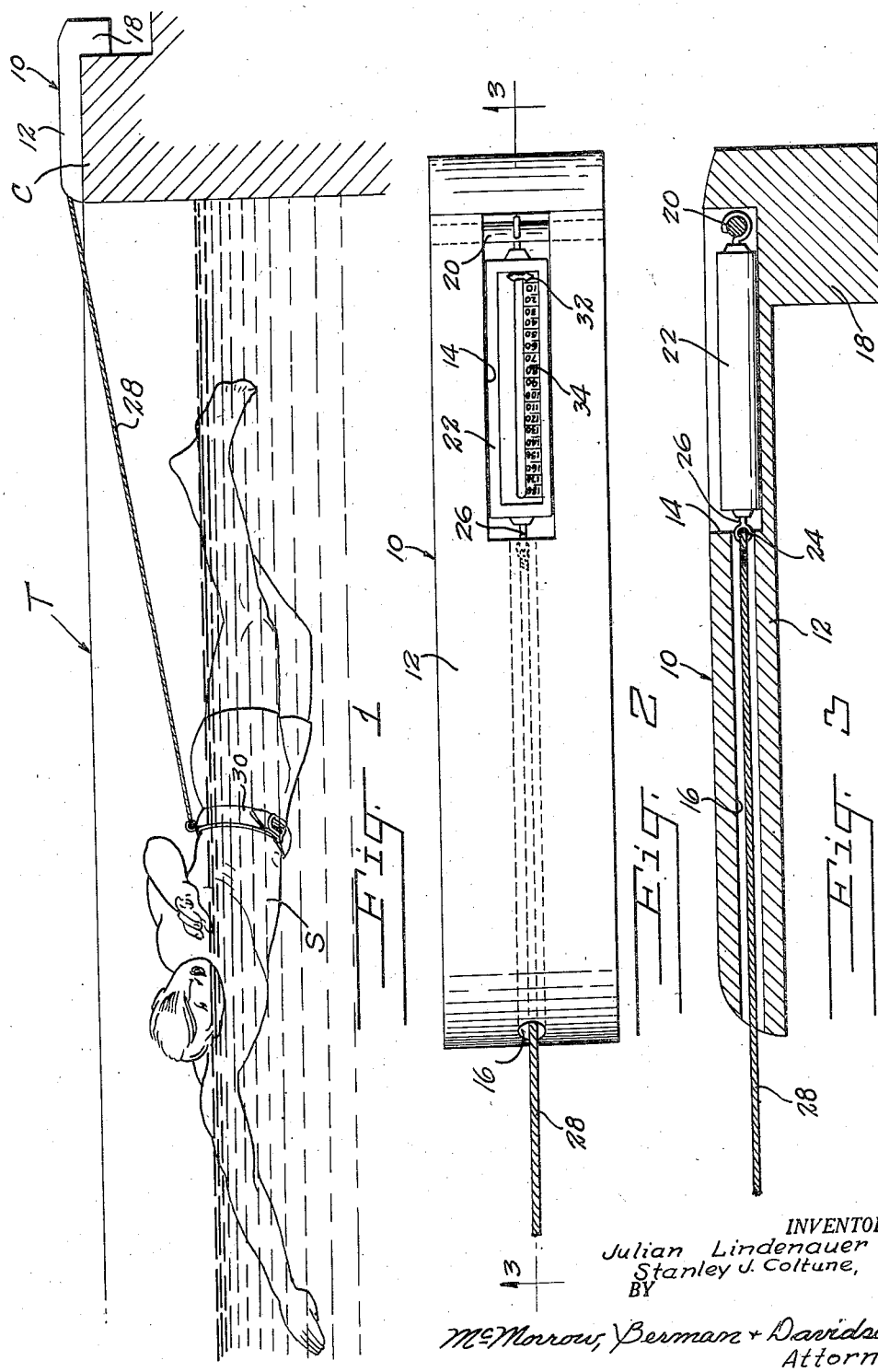
INVENTORS
Julian Lindenauer &
Stanley J. Coltune,
BY
McMorrow, Berman + Davidson
Attorneys.

United States Patent Office 2,825,224
Patented Mar. 4, 1958

2,825,224
SWIMMING STROKE DEVELOPMENT INDICATOR

Julian Lindenauer and Stanley J. Coltune, Miami Beach, Fla.

Application June 29, 1956, Serial No. 594,985

1 Claim. (Cl. 73—141)

This invention relates to a swimming stroke development indicator and has for its primary object to indicate to a swimming instructor the effort exerted by a swimmer in a tank.

Another object is to enable the device to be readily connected to or detached from the tank so that it may be used by a swimmer in different tanks.

The above and other objects may be attained by employing this invention which embodies among its features a spring balanced scale mounted on a swimming tank, a cable connected to the scale, and a belt connected to the cable remote from the scale and adapted to encircle a waist of a swimmer in the tank to operate the scale and cause it to indicate the effort exerted thereon by the swimmer.

Other features include a hook carried by the scale and extending downwardly therefrom adjacent the ends thereof adjacent the scale for engaging the swimming tank and holding the scale in position thereon.

Still other features include a body having an elongated longitudinally extending recess opening through its upper face adjacent one end, said body having a longitudinal bore extending therethrough and communicating with the recess, said bore opening through the end of the body remote from the recess, a hook carried by the body and projecting downwardly therefrom adjacent the end thereof remote from the bore for engaging the edge of a swimming tank and holding the device in place thereon, a bar carried by the body and extending transversely across the recess adjacent the end thereof adjacent the hook, a spring balanced scale held in the recess by the bar, a cable connected to the scale and extending longitudinally therefrom through the bore, and a belt connected to the cable for encircling the waist of a swimmer swimming in a tank and causing the scale to register the effort exerted by the swimmer on the cable.

In the drawings:

Figure 1 is a fragmentary sectional view through a swimming tank showing the device mounted thereon and connected to a swimmer, Figure 2 is an enlarged top plan view of the swimming stroke development indicator, and Figure 3 is a longitudinal sectional view taken substantially on the line 3—3 of Figure 2.

Referring to the drawings in detail this improved swimming stroke development indicator designated generally 10 comprises an elongated body 12 having an elongated longitudinally extending recess 14 opening through its upper face adjacent one end of said body.

Extending longitudinally through said body and communicating with the recess 14 is a bore 16 which opens through the end of the body remote from the recess 14 as will be readily understood upon reference to the drawings. Carried by the body and projecting downwardly therefrom adjacent the end adjacent the recess 14 is an extension 18 defining a hook which as illustrated in Figure 1 is adapted to engage the curbing C of a conventional swimming tank designated generally T.

Carried by the body 12 and extending transversely thereacross and across the recess 14 adjacent the end thereof adjacent the hook 18 is a bar 20 which provides an anchor by means of which a conventional spring balanced scale 22 is held in the recess 14. Connected to the eye 24 of the tension bar 26 of the scale 22 is a cable 28 which extends through the bore 16 and has connected to its end remote from the spring balanced scale 22 a suitable belt 30 which as illustrated in Figure 1 is adapted to encircle the waist of a swimmer S in the tank T so that as the swimmer swims away from the indicator 10 the cable 28 will be placed under tension so as to exert pull on the tension bar 26 and cause the indicator 32 to register the pull exerted by the swimmer on the scale 34 of the spring balanced scale 22.

In use it will be evident that the device is placed on the curbing C of the tank T as indicated in Figure 1 and the belt 30 is attached about the waist of the swimmer S. As the swimmer swims away from the scale 22 the effort exerted by him in the tank will be registered on the scale 34 so that a coach or instructor may direct the swimmer and produce the most desirable results.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A swimming stroke development indicator comprising an elongated body having an elongated longitudinally extending recess opening through its upper face adjacent one end, said body having a longitudinal bore extending therethrough and communicating with the recess, said bore opening through the end of the body remote from the recess, a hook carried by the body and projecting downwardly therefrom adjacent the end thereof remote from the bore for engaging the edge of a swimming tank, a bar carried by the body and extending transversely across the recess adjacent the end thereof adjacent the hook, a spring balanced scale held in the recess by the bar, a cable connected to the scale and extending longitudinally therefrom through the bore, and a belt connected to the cable for encircling the waist of a swimmer swimming in the tank and causing the scale to register the effort exerted by the swimmer on the cable.

References Cited in the file of this patent

UNITED STATES PATENTS

| | | |
|---|---|---|
| 397,160 | White | Feb. 5, 1889 |
| 703,713 | Smith et al. | July 1, 1902 |
| 1,247,249 | Felcyn | Nov. 20, 1917 |
| 1,817,872 | Bray | Aug. 4, 1931 |